United States Patent
Fushiki et al.

(10) Patent No.: US 8,515,655 B2
(45) Date of Patent: Aug. 20, 2013

(54) NAVIGATION DEVICE AND METHOD FOR ROUTE CALCULATION

(75) Inventors: Takumi Fushiki, Hitachi (JP); Tomoaki Hiruta, Hitachi (JP); Toshiaki Kono, Ashford (GB)

(73) Assignee: Clarion Co., Ltd., Tokyo (JP)

(*) Notice: Subject to any disclaimer, the term of this patent is extended or adjusted under 35 U.S.C. 154(b) by 303 days.

(21) Appl. No.: 12/805,831

(22) Filed: Aug. 20, 2010

(65) Prior Publication Data

US 2011/0077854 A1    Mar. 31, 2011

(30) Foreign Application Priority Data

Sep. 30, 2009   (JP) .................. 2009-226596

(51) Int. Cl.
*G06F 19/00*   (2011.01)
*G08G 1/123*   (2006.01)

(52) U.S. Cl.
USPC ..................... 701/123; 340/995.19

(58) Field of Classification Search
USPC ............. 701/400–541, 123; 340/988–996, 340/995.27, 427, 476, 644, 5.31, 7.55, 12.27, 340/679, 426.25, 12.1, 438, 435; 342/176, 342/374; 345/11
See application file for complete search history.

(56) References Cited

U.S. PATENT DOCUMENTS

2009/0048775 A1 * 2/2009 Okude et al. ............... 701/202

FOREIGN PATENT DOCUMENTS

| JP | 10-170293 | | 6/1998 |
| JP | 2002-162235 | | 6/2002 |
| JP | 2002-162235 | * | 7/2002 |
| JP | 2006-275774 | | 10/2006 |
| JP | 2007-078368 | * | 3/2007 |
| JP | 2008-032472 | | 2/2008 |

* cited by examiner

*Primary Examiner* — Muhammad Shafi
(74) *Attorney, Agent, or Firm* — Antonelli, Terry, Stout & Kraus, LLP.

(57) ABSTRACT

A navigation device includes: a position detecting unit; a remaining energy level detecting unit; a storage unit that stores map information including position information of a charging point of a drive energy; an energy consumption amount calculation unit that calculates a consumption amount of the drive energy when a vehicle travels along any link included based upon the map information; a route calculation unit that calculates a route from a current position to a destination point; and a route guidance unit. The route calculation unit calculates a recommended route with a minimum attainment cost among routes in which the remaining level does not fall below a predetermined threshold level based upon the map information, the remaining level on departure of the vehicle detected by the remaining energy level detecting unit, and the consumption amount calculated by the energy consumption amount calculation unit.

8 Claims, 13 Drawing Sheets

FIG.6

| | NAME | VALUE | | |
|---|---|---|---|---|
| START NODE #1 | START NODE ID | 10001 | N1 | |
| | NUMBER OF CONNECTION NODES (n) | 3 | N2 | |
| | CONNECTION NODE #1 — CONNECTION NODE ID | 10002 | L1 | |
| | LINK LENGTH | 100m | L2 | L |
| | TIME | 5 SECONDS | L3 | |
| | CHARGING POINT FLAG | 1 | L4 | |
| | CHARGING POINT ID | 100 | L5 | |
| | ⋮ | | | |
| | CONNECTION NODE #n — CONNECTION NODE ID | 10002 | L1 | |
| | LINK LENGTH | 200m | L2 | L |
| | TIME | 10 SECONDS | L3 | |
| | CHARGING POINT FLAG | 0 | L4 | |
| ⋮ | | | | |
| START NODE #m | | | N | |

| | NAME | VALUE | |
|---|---|---|---|
| CHARGING POINT #1 | CHARGING POINT ID | 100 | S1 |
| | CHARGING POINT NAME | XXX ELECTRIC CHARGE SERVICE | S2 |
| | GENRE OF CHARGING POINT | YYY ELECTRIC POWER | S3 |
| | TYPE OF CHARGING ENERGY | ELECTRIC CHARGE | S4 |
| | CORRESPONDING NODE ID | 10001 | S5 |
| | NORMALIZED COORDINATES (X, Y) | (100, 200) | S6 |
| ⋮ | | | |
| CHARGING POINT #m | | | S |

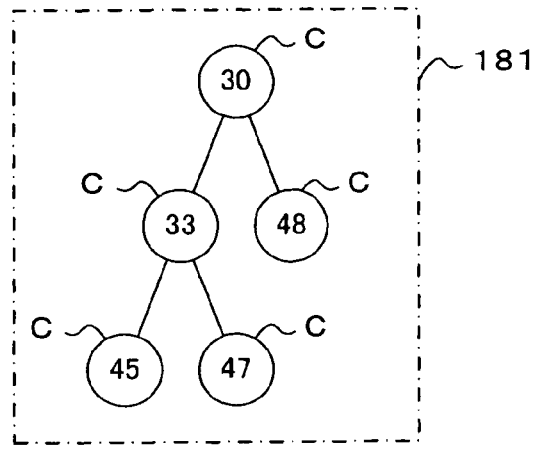

FIG.8B

| NAME | EXAMPLE OF VALUE | |
|---|---|---|
| ARRIVAL NODE ID (SERIAL NUMBER) | 10001 (2) | C1 |
| PREVIOUS NODE ID (SERIAL NUMBER) | 10002 (3) | C2 |
| ATTAINMENT COST | 60 | C3 |
| MINIMUM REMAINING LEVEL | 50% | C4 |
| MAXIMUM REMAINING LEVEL | 90% | C5 |
| CHARGING POINT (FIXED CHARGING POINT) NODE ID (SERIAL NUMBER) AT MINIMUM REMAINING LEVEL | 10000 (0) | C6 |
| CHARGING POINT (PRECEDING CHARGING POINT) NODE ID (SERIAL NUMBER) AT MAXIMUM REMAINING LEVEL | 10003 (4) | C7 |
| ATTAINMENT ENABLE/ DISABLE FLAG | ENABLE | C8 |

FIG.9

| | ID | FIXED INFORMATION | | | | UNFIXED INFORMATION | | DL |
|---|---|---|---|---|---|---|---|---|
| SERIAL NUMBER | | ATTAIN-MENT COST | PREVI-OUS ID | REMAINING LEVEL | | MINIMUM COST | MAXIMUM REMAINING LEVEL | |
| | | | | MINIMUM | MAXIMUM | | | |
| 1 | 10000 | 30 | 10008 | 90% | 90% | N/A | N/A | |
| 2 | 10001 | N/A | 10002 | N/A | N/A | 50 | 70% | |
| 3 | 10002 | 40 | 10005 | 60% | 60% | 60 | 80% | |
| 4 | 10003 | 45 | 10004 | 30% | 80% | 60 | 90% | |
| 5 | 10004 | N/A | 10002 | N/A | N/A | N/A | N/A | |
| | | | | | | | | |
| | | | | | | | | |

FIG.14

| | NAME | EXAMPLE OF VALUE |
|---|---|---|
| NODE DATA #1 | ARRIVAL NODE ID (SERIAL NUMBER) | 10001 (2) |
| | PREVIOUS NODE ID (SERIAL NUMBER) | 10002 (3) |
| | ATTAINMENT COST | 0 |
| | MINIMUM REMAINING LEVEL | 90% |
| | MAXIMUM REMAINING LEVEL | 90% |
| | CHARGING POINT (FIXED CHARGING POINT) NODE ID (SERIAL NUMBER) AT MINIMUM REMAINING LEVEL | – |
| | CHARGING POINT (PRECEDING CHARGING POINT) NODE ID (SERIAL NUMBER) AT MAXIMUM REMAINING LEVEL | – |
| | ATTAINMENT ENABLE/ DISABLE FLAG | ENABLE |
| : | | |
| NODE DATA #k CHARGING POINT NODE ID AT MINIMUM REMAINING LEVEL | | |
| | | |
| NODE DATA #n | | |

NAVIGATION DEVICE AND METHOD FOR ROUTE CALCULATION

INCORPORATION BY REFERENCE

The disclosure of the following priority application is herein incorporated by reference: Japanese Patent Application No. 2009-226596 filed Sept. 30, 2009.

BACKGROUND OF THE INVENTION

1. Field of the Invention

The present invention relates to a navigation device and a method for a route calculation.

2. Description of Related Art

There is a known technique of car navigation devices for performing change and display of routes in view of the remaining energy level of a car. The remaining energy level of a car refers to, for example, the remaining level of fuel such as gasoline in the case of a vehicle which uses an internal combustion engine, the remaining capacity of a battery in the case of an electric vehicle, or the remaining level of hydrogen fuel itself or remaining level of fluid to be converted into hydrogen in the case of a hydrogen vehicle. In addition, "in view of the remaining energy level" refers to a consideration of energy charging at a charging point so as to prevent a lack of energy while the vehicle is traveling. For instance, the route calculation device disclosed in Japanese Laid-Open Patent Publication No. H10-170293 searches a route in which the distance from a departure point to a first energy charge station is equal to or less than the cruising distance and the distance of each energy charge station section from the first energy charge station to a destination point is equal to or less than the cruising distance with the full battery level.

SUMMARY OF THE INVENTION

The route calculation device disclosed in Japanese Laid-Open Patent Publication No. H10-170293 selects all combinations of routes that include an energy charging point and searches from them a route that can attain to the destination point. As a result, there was a problem of an enormous number of combinations of routed to be searched, thereby requiring a huge amount of calculations.

According to the 1st aspect of the present invention, a navigation device comprises: a position detecting unit that detects a current position of a vehicle; a remaining energy level detecting unit that detects a remaining level of drive energy of the vehicle; a storage unit that stores map information including position information of a charging point of the drive energy for the vehicle; an energy consumption amount calculation unit that calculates a consumption amount of the drive energy when the vehicle travels along any link included in the map information based upon the map information; a route calculation unit that calculates a route from the current position to a destination point; and a route guidance unit that performs route guidance for the vehicle based upon a result of calculation by the route calculation unit. The route calculation unit calculates a recommended route with a minimum attainment cost among routes in which the remaining level does not fall below a predetermined threshold level based upon the map information, the remaining level on departure of the vehicle detected by the remaining energy level detecting unit, and the consumption amount calculated by the energy consumption amount calculation unit.

According to the 2nd aspect of the present invention, in the navigation device according to the 1st aspect, it is preferred that the navigation device further comprises: a notification unit that notifies a driver of energy charging timing of the drive energy during the route guidance by the route guidance unit. The route calculation unit calculates the energy charging timing in which a frequency of charging the drive energy is minimum at the charging point through which the vehicle passes when traveling along the recommended route; and the notification unit performs notification of the energy charging timing based upon the energy charging timing calculated by the route calculation unit.

According to the 3rd aspect of the present invention, in the navigation device according to the 2nd aspect, it is preferred that the route calculation unit calculates and stores the minimum attainment cost as well as a minimum value and a maximum value of the remaining level in calculation of the recommended route.

According to the 4th aspect of the present invention, in the navigation device according to the 1st aspect, it is preferred that the navigation device further comprises: an upper and lower threshold level setting unit that sets the predetermined threshold level and an upper threshold level of the remaining level. The route calculation unit calculates the recommended route in a condition that charging of the drive energy at the charging point increases the remaining level to the upper threshold level.

According to the 5th aspect of the present invention, in the navigation device according to the 1st aspect, it is preferred that the navigation device further comprises: an attainment enable/disable determination unit that makes a decision as to whether or not the vehicle can attain to the destination point with the remaining level not falling below the predetermined threshold level.

According to the 6th aspect of the present invention, in the navigation device according to the 1st aspect, it is preferred that the navigation device further comprises: a lower threshold value setting unit that sets a lower threshold value of the remaining level at the destination point. The route calculation unit calculates the recommended route in which the remaining level at the destination point is equal to or greater than the lower threshold value.

According to the 7th aspect of the present invention, in the navigation device according to the 1st aspect, it is preferred that the route calculation unit calculates the recommend route via the charging point in reference to the position information of the charging point.

According to the 8th aspect of the present invention, in the navigation device according to the 1st aspect, it is preferred that a frequency of charging the drive energy at the energy charging point is minimum in the recommended route among a plurality of routes from the current position to the destination point calculated by the route calculation unit.

According to the 9th aspect of the present invention, a method for a route calculation comprises: a remaining energy level setting step of setting a remaining level of drive energy of a vehicle on departure; an energy consumption amount calculation step of calculating a consumption amount of the drive energy, based upon map information including position information of a charging point of the drive energy for the vehicle, when the vehicle travels along any link included in the map information; and a route calculation step of calculating a route from the current position to a destination point. In the route calculation step, a recommended route including a minimum attainment cost is calculated among routes with the remaining level not falling below a predetermined threshold level, based upon the map information, the remaining level on departure of the vehicle set in the remaining energy level setting step, and the consumption amount calculated in the energy consumption amount calculation step.

BRIEF DESCRIPTION OF THE DRAWINGS

FIG. 6 is an illustration showing the data structure of the network map DB 122.

FIG. 7 is an illustration showing the data structure of the charging point DB 123.

FIGS. 8A and 8B are illustrations showing the data structure of a candidate node heap.

FIG. 9 is an illustration showing the data structure of a fixed node list.

FIG. 14 is an illustration showing the data structure of a recommended route.

DESCRIPTION OF PREFERRED EMBODIMENTS

First Embodiment

Figure 1:
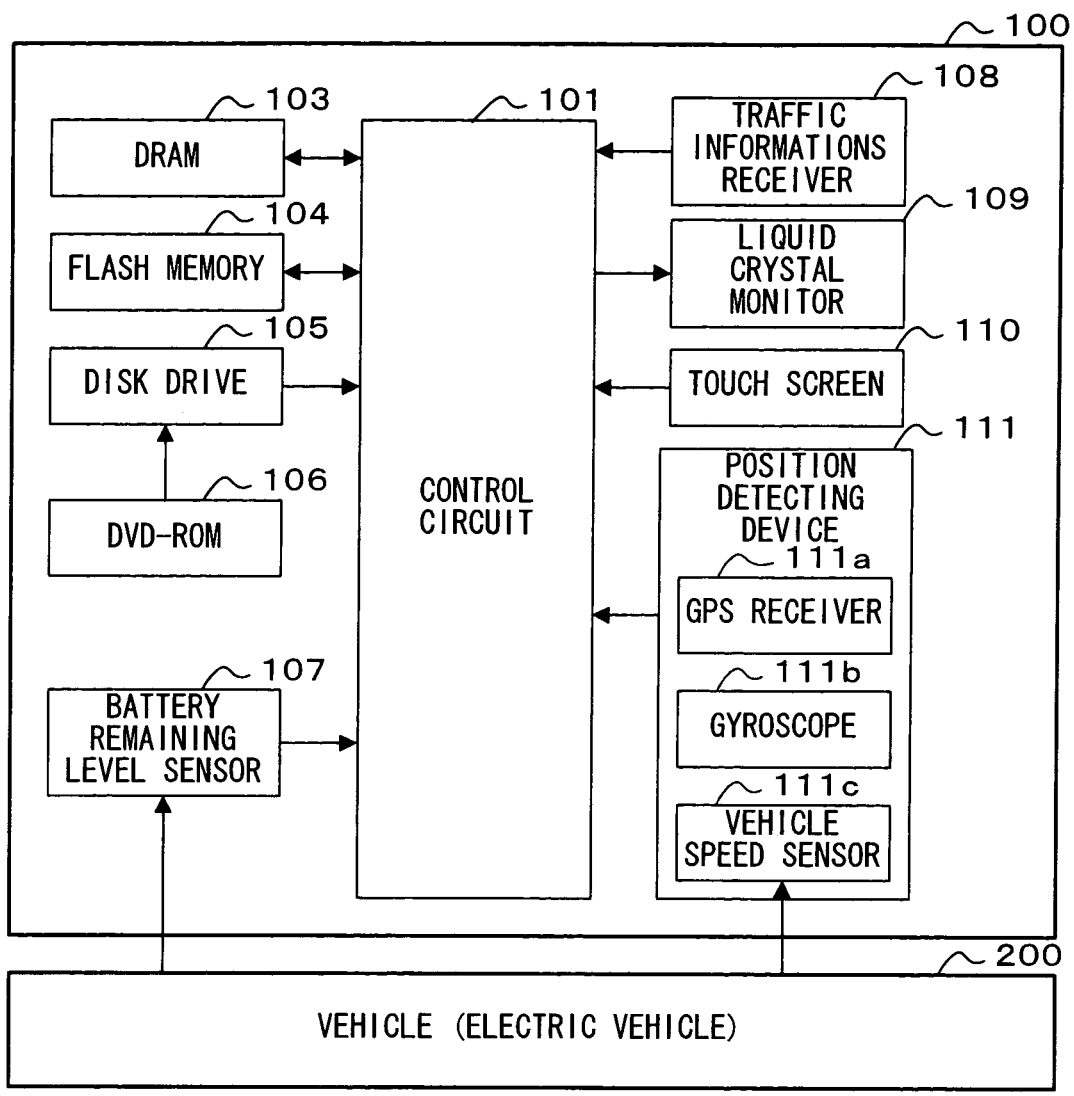
FIG. 1 is a block diagram showing the structure of the navigation device of the first embodiment of the present invention.

FIG. 1 is a block diagram showing the structure of the navigation device of the first embodiment of the present invention. A navigation device 100 is mounted on a vehicle 200 so as to perform route search and route guidance in view of the remaining energy level of the vehicle 200. Here, the vehicle 200 is a so-called electric vehicle, which is driven by electrical energy charged in a battery. In the first embodiment, the remaining energy level of the vehicle 200 therefore refers to the remaining level of the battery of the vehicle 200.

(Explanation of Car Navigation Device) The car navigation device 100 includes a control circuit 101, a DRAM 103, a non-volatile memory 104, a disk drive 105, a battery remaining level sensor 107, a traffic informations receiver 108, a liquid crystal monitor 109, a touch screen 110, and a position detecting device 111. A DVD-ROM 106 is loaded in the disk drive 105.

The control circuit 101 includes a microprocessor and its peripheral circuitry. The DRAM 103 is a volatile storage device. The non-volatile memory 104 is a non-volatile storage medium, for example, a flash memory. A predetermined control program is stored in the non-volatile memory 104. The control circuit 101 uses the DRAM 103 as a work area so as to carry out the control program stored in the non-volatile memory 104 and thus performs a variety of controls. The disk drive 105 is a device that reads data from the DVD-ROM 106.

The battery remaining level sensor 107 is a sensor connected to the vehicle 200. The battery remaining level sensor 107 detects the remaining level of the battery included in the vehicle 200 and notifies the control circuit 101 thereof. The traffic informations receiver 108 receives traffic informations provided by, for instance, VICS (Vehicle Information and Communication System) (registered trademark in Japan), TMC (Traffic Message Channel) or the like and outputs them to the control circuit 101. Here, the traffic informations refer to road congestion informations, incident informations, and the like.

Based upon image data output from the control circuit 101, the liquid crystal monitor 109 presents a variety of information through the screen to those on board in the vehicle 200. The touch screen 110 is a transparent touch switch laminated on the surface of the liquid crystal monitor 109. An image is displayed on the liquid crystal monitor 109 through the touch screen 110. When one of those on board pushes a display screen of the liquid crystal monitor 109, the touch screen 110 is pushed. At this time, an operation signal including information of a pushed position is output from the touch screen 110 to the control circuit 101. The control circuit 101 then sets a destination point at the position pushed on a map displayed on the liquid crystal monitor 109 and carries out the processing defined by a variety of buttons and a display menu displayed at the pushed position.

The position detecting device 111 is a device that detects the current position of the vehicle 200. The position detecting device 111 includes a variety of sensors such as a GPS (Global Positioning System) receiver 111a, a gyroscope 111b, and a vehicle speed sensor 111c. The GPS receiver 111a receives a signal sent out from a GPS satellite so as to detect the absolute position of the vehicle 200. The gyroscope 111b detects the direction of travel of the vehicle 200. The vehicle speed sensor 111c receives a vehicle speed pulse signal output from the vehicle 200 so as to detect the vehicle speed of the vehicle 200. The position detecting device 111 calculates a variety of information detected by those sensors so as to detect the current position of the vehicle 200.

Upon reception of the destination point of the route guidance entered by the user, the navigation device 100, based upon the algorithm described later in detail, performs route calculation to the destination point with the current position detected by the position detecting device 111 as the departure point. The navigation device 100 causes the display screen of the liquid crystal monitor 109 to display the map and causes a route determined by the route calculation, i.e., a recommended route, to be displayed on the map. The navigation device 100 performs an instruction on the direction of travel to the user through an image, a voice, or the like and gives route guidance to the vehicle 200 so that the vehicle 200 can travel along the recommended route.

Figure 2:
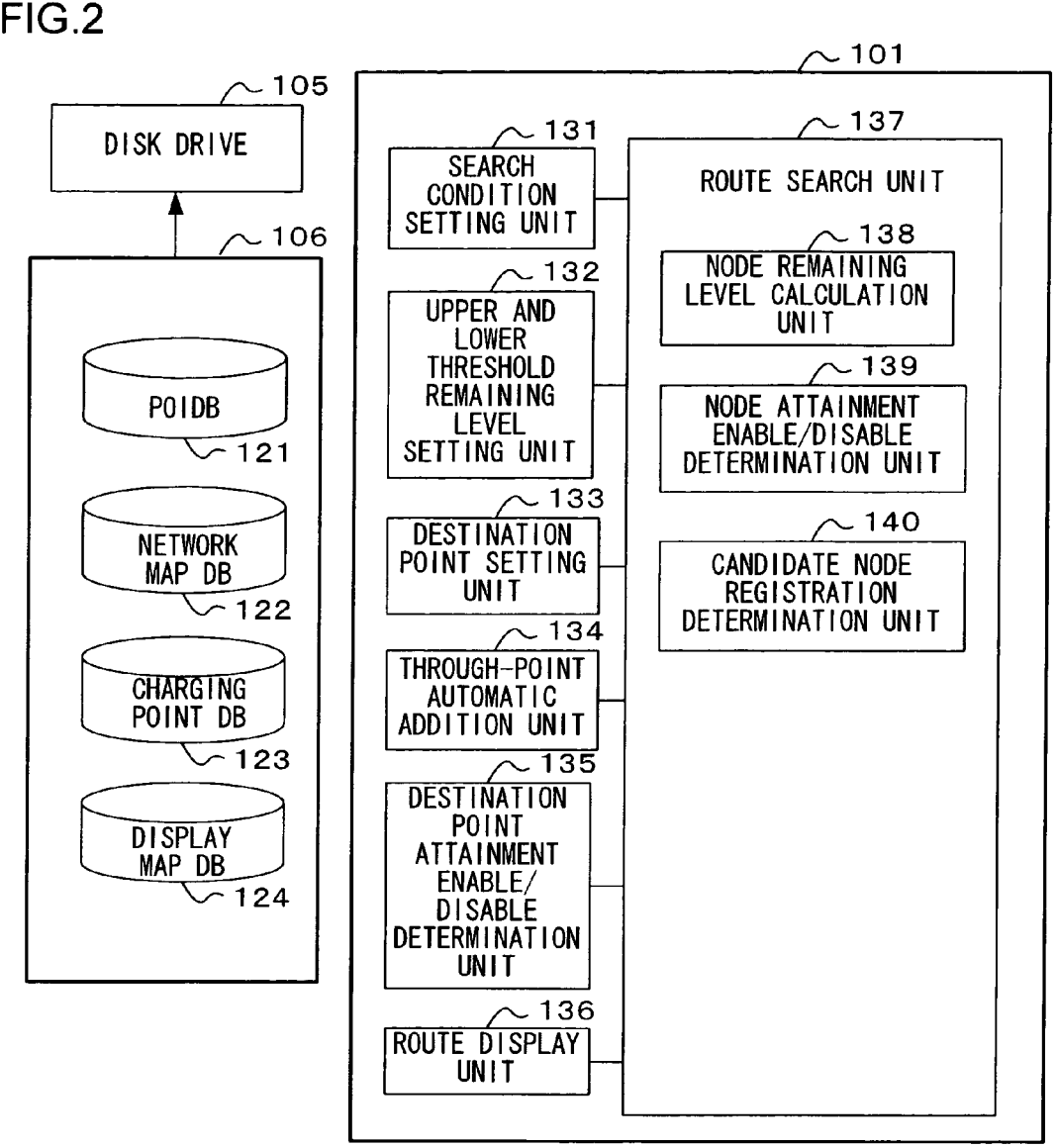
FIG. 2 is a block diagram representing details of the control circuit 101 and the DVD-ROM 106.

FIG. 2 is a block diagram representing details of the control circuit 101 and the DVD-ROM 106. A POIDB (Point Of Interest Data Base) 121, a network map DB 122, a charging point DB 123, and a display map DB 124 are stored in the DVD-ROM 106. The POIDB 121 is a database in which data for setting a destination point of route search of landmarks, tourist spots, and the like is arranged in a manner in which a variety of searches such as genre search and name search are available. The network map DB 122 is a database in which a network map used for route search is stored. Similar to publicly known network maps, the network map stored in the network map DB 122 expresses a road network by a combination of a node such as an intersection and a link between nodes.

The charging point DB 123 is a database including information of a facility in which energy is charged in the vehicle. This type of facility is referred to as a charging point in the explanation below. In the present embodiment, an energy charge station that charges the vehicle 200, which is an electric vehicle, is a charging point. The display map DB 124 is a database in which data for displaying a map on the display screen of the liquid crystal monitor 109, for example, a road, a railway, the shape of a land, the shape of a facility, the name of a place, and the like, are stored. The road data among the data stored in the display map DB 124 shares IDs of a link and a node with the road data of the network map DB 122. This allows the road data to be cross referenced between the network map DB 122 and the display map DB 124. The control circuit 101 performs cross reference of the road data when, for instance, a result of a route search is displayed on the screen.

The control circuit 101 includes a search condition setting unit 131, an upper and lower threshold remaining level setting unit 132, a destination point setting unit 133, a through-point automatic addition unit 134, a destination point attainment enable/disable determination unit 135, a route display unit 136, and a route search unit 137. The route search unit 137 further includes a node remaining level calculation unit 138, a node attainment enable/disable determination unit 139, and a candidate node registration determination unit 140. Each of those functional units is achieved in software by the control circuit 101 carrying out the control program stored in the non-volatile memory 104.

Based upon the entry by the user with the touch screen 110, the search condition setting unit 131 sets a condition for route search. The condition for route search may include distance priority, time priority, low fee of charge, or low energy consumption. The route search un setting unit 131.

Based upon the entry by the user with the touch screen 110, the upper and lower threshold remaining level setting unit 132 sets the upper threshold and the lower threshold of the remaining energy level for the route search. The upper and lower threshold remaining level setting unit 132 further sets the lower threshold of the remaining energy level at the time of arrival at the destination point. The route search unit 137 performs a route search within the range of the remaining energy level set by the upper and lower threshold remaining level setting unit 132. For instance, when the upper and lower threshold remaining level setting unit 132 sets the lower threshold of the remaining energy level to 20%, the route search unit 137 searches a recommended route in which the remaining energy level when traveling always exceeds 20% of the maximum capacity of the battery.

Based upon the entry by the user with the touch screen 110, the destination point setting unit 133 sets the destination point of the route search. The destination point setting unit 133 uses the POIDB 121 so as to provide the user with an entry method of the destination point widely used in navigation devices such as genre search, name search, and selection from the map display.

Based upon a charging point node group included in the recommended route, the through-point automatic addition unit 134 adds a through-point to the recommended route. Based upon an output of the route search unit 137, the destination point attainment enable/disable determination unit 135 determines enable/disable of attainment to the destination point.

The route display unit 136 causes the display screen of the liquid crystal monitor 109 to display the map and causes a route output by the route search unit 137 to be displayed on the map. The route display unit 136 causes the recommended route to be displayed in a display form different from that of other roads and the like, e.g., in a different display color. This allows the user to distinguish on the screen the recommended route on the map from other roads and the like. In addition, when a through-point is included in the recommended route, the route display unit 136 causes the through-point to be displayed in a display form different from that of other nodes.

The route search unit 137 performs a route search from the departure point, which is a current position detected by the position detecting device 111, to the destination point, which is set by the destination point setting unit 133. The route search unit 137 performs this route search based upon the remaining level of the battery detected by the battery remaining level sensor 107, the traffic informations output by the traffic informations receiver 108, the network map DB 122 stored in the DVD-ROM 106, and the condition for route search set by the search condition setting unit 131. The route search unit 137 outputs the recommended route if it successfully performs the route search. On the other hand, the route search unit 137 outputs a part of the route from the departure point to the destination point if it fails to perform the route search.

During the route search processing, the node remaining level calculation unit 138 calculates the remaining energy level of the vehicle 200 at each node in view of whether or not it has passed through the charging point. The node attainment enable/disable determination unit 139 makes a decision as to whether or not the vehicle 200 can attain to each node at a remaining energy level that exceeds the lower threshold of the remaining energy level set by the upper and lower threshold remaining level setting unit 132. The candidate node registration determination unit 140 makes a decision as to whether or not it is necessary to continue the route search processing for each of the nodes.

Figure 3:
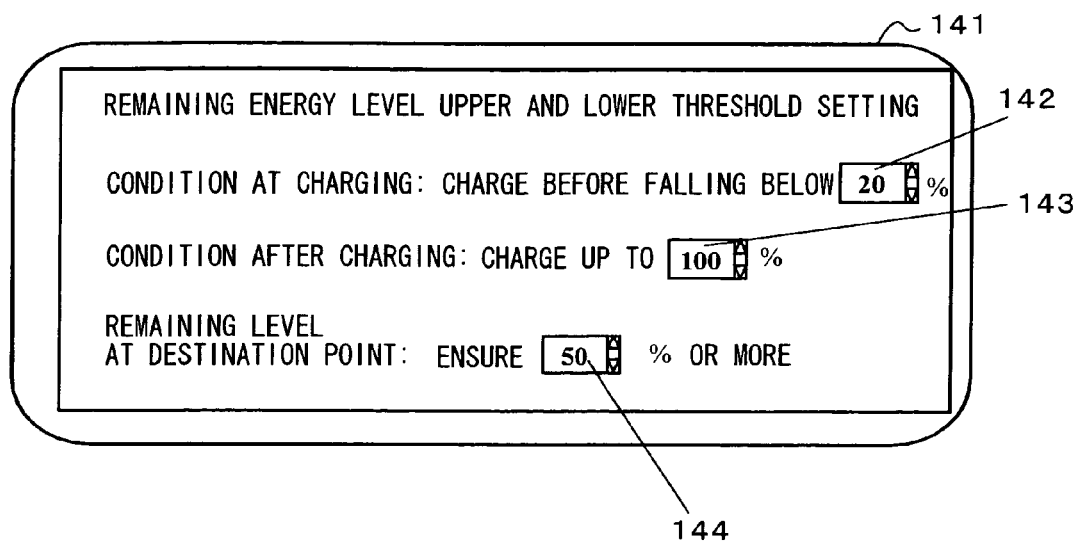
FIG. 3 is an illustration showing an energy upper and lower threshold remaining level setting screen on which the user enters energy upper and lower threshold remaining levels into the upper and lower threshold remaining level setting unit 132.

(Explanation of Upper and Lower Threshold Remaining Level Setting) FIG. 3 is an illustration showing the energy upper and lower threshold remaining level setting screen on which the user enters the energy upper and lower threshold remaining levels into the upper and lower threshold remaining level setting unit 132. The user can call up an energy upper and lower threshold remaining level setting screen 141 with the touch screen 110 prior to the route search. With the touch screen 110, the user can enter a lower threshold 142 and an upper threshold 143, both of the remaining energy level, and a lower threshold 144 of the remaining energy level at the destination point. Based upon those entries, the upper and lower threshold remaining level setting unit 132 sets the upper threshold and the lower threshold of the remaining energy level for the route search.

Figure 4A:
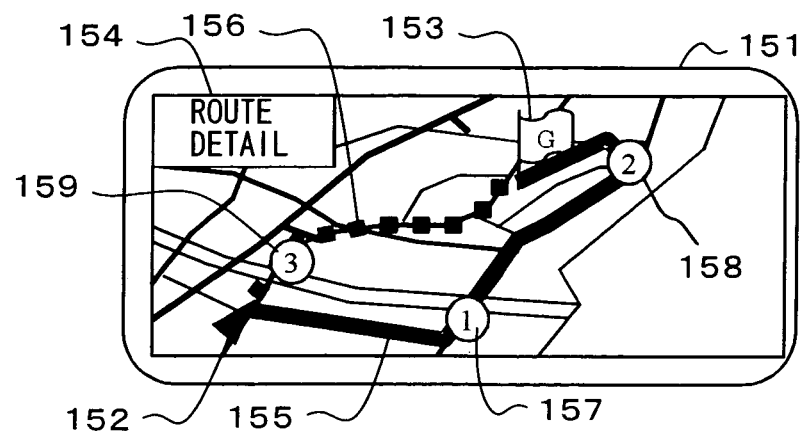
FIGS. 4A and 4B are illustrations showing examples of route display screens displayed by the route display unit 136.
Figure 4B:
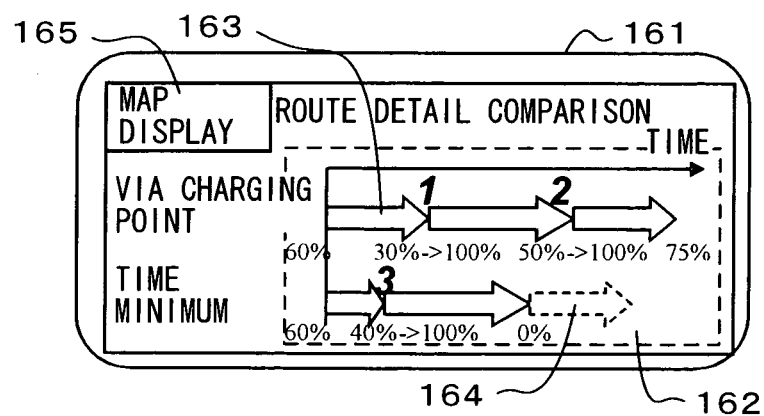

(Explanation of Route Display) FIGS. 4A and 4B are illustrations showing examples of the route display screens displayed by the route display unit 136. FIG. 4A shows a route display screen 151 on which a recommended route 155 is overlaid on the map. A current position 152, a destination point 153, a button 154, the recommended route 155, a route 156, charging points 157 and 158 on the recommended route 155, and a charging point 159 on the route 156 are displayed on the screen 151. The recommended route 155 is a route output by the route search unit 137. The route 156, which is drawn in dashed line, is a route output by the route search unit 137 without consideration for a charging point by a publicly known route search method. The route display unit 136 renders the screen 151 based upon the display map DB 124. Although the charging points 157, 158, and 159 are expressed by adding numerals 1 to 3 on the screen 151, it may also be arranged that the names of the charging points 157, 158, and 159 are given in place of those numerals. When the user pushes down the button 154 with the touch screen 110, the route display unit 136 switches the display screen of the liquid crystal monitor 109 from the screen 151 to a detailed display screen 161 shown in FIG. 4B.

The detailed display screen 161 shown in FIG. 4B is a screen on which the two routes 155 and 156 described above are compared including the through-points on the basis of a common time axis. Change in the remaining energy level when the vehicle 200 travels along each of the routes is displayed by arrows and numerals on a region 162 of the screen 161. Arrows 163 and 164 are arrows that represent the routes. In particular, the arrow 164, which is drawn in dashed line, shows the route in which the energy is insufficient while traveling. Change in the remaining energy level at each point in time is displayed in the numerals below the arrows. When the user pushes down a button 165 with the touch screen 110, the route display unit 136 switches the display screen of the liquid crystal monitor 109 from the screen 161 to the route display screen 151 shown in FIG. 4A. It is to be noted that although the lateral direction of the region 162 represents elapsed time in FIG. 4B, it may also be arranged to represent travel distance.

It is to be noted that if, after the route search, the destination point attainment enable/disable determination unit 135 makes a decision that the vehicle 200 has failed to search a route that attains to the destination point, the route display unit 136 may cause the liquid crystal monitor 109 to display that there is no searchable route. In addition, in this case, the route display unit 136 causes the part of the route output by the route search unit 137 to be displayed.

Figure 5:
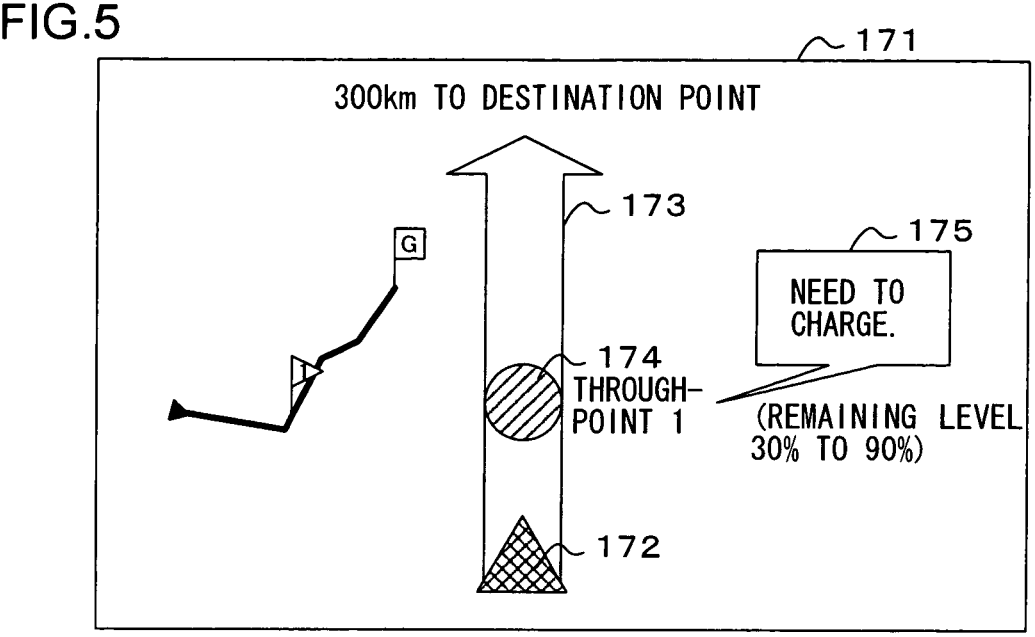
FIG. 5 is an illustration showing an example of a route guidance screen.

(Explanation of Route Guidance Screen) FIG. 5 is an illustration showing an example of a route guidance screen. When the navigation device 100 is performing route guidance, the route display unit 136 causes the liquid crystal monitor 109 to display a route guidance screen 171. The route guidance screen 171 notifies the user of a through-point added by the through-point automatic addition unit 134 to the recommended route. More specifically, the route display unit 136 causes a mark 174 representing the through-point overlaid on an arrow 173 representing the direction of travel of a vehicle 172 to be displayed on the screen 171. In addition, the route display unit 136 uses a pop-up message 175 so as to notify the user of the need for energy charging at the through-point, and causes numerals representing the amount of change in the remaining energy level due to the energy charging to be displayed below the pop-up message 175.

(Explanation of Database) FIG. 6 is an illustration showing the data structure of the network map DB 122. A plurality of pieces of node information N are stored in the network map DB 122. The individual pieces of node information N are, similar to publicly known network maps, constituted with a start node ID N1, the number of connection nodes N2, and one or more pieces of connection node information L. In addition, the individual pieces of connection node information L, similar to publicly known network maps, include a connection node ID L1, a link length L2, and a required time L3.

In the present embodiment, the connection node information L further includes a charging point flag L4 and a charging point ID L5. The charging point flag L4 is a flag representing whether or not the said node is the charging point. In other words, if the value of the charging point flag L4 is 1, an energy charge station exists at the position of the said node. The charging point ID L5 is an ID for specifying the charging point. The control circuit 101 can perform reference of the charging point DB 123 at high speed by using the charging point ID L5. If the value of the charging point flag L4 of the connection node information L is 0, the connection node information L does not include the charging point ID L5.

FIG. 7 is an illustration showing the data structure of the charging point DB 123. A plurality of pieces of charging point information S are stored in the charging point DB 123. The individual pieces of charging point information S include a charging point ID S1, a charging point name S2, a charging point genre S3, a charging energy type S4, a corresponding node ID S5, and normalized coordinates S6. The charging point ID S1 is an ID uniquely assigned to the individual charging points. The charging point ID S1 is stored in the charging point ID L5 included in the network map DB 122 described earlier.

The charging point name S2 represents the name of the charging point. The charging point genre S3 is the genre name for classifying each of the charging points. The charging energy type S4 is a type of energy that can be charged at this charging point. In the present embodiment, the charging energy type S4 is "electric charge". The corresponding node ID S5 is a start node ID for referring the node information N stored in the network map DB 122. The control circuit 101 can perform reference of the network map DB 122 at high speed by using the corresponding node ID S5. The normalized coordinates S6 are coordinates representing the position of the charging point.

(Explanation of Data Structure Treated in Route Search Processing) The route search unit 137 treats two data sets, "candidate node heap" and "fixed node list", in the route search processing. Each of those data sets is the data structure used in Dijkstra's Algorithm, which is a publicly known minimum route search method, to which some data items are added.

FIGS. 8A and 8B are illustrations showing the data structure of a candidate node heap. As shown in FIG. 8A, a candidate node heap 181 has a publicly known heap structure based upon one or a plurality of pieces of arrival node data C. The heap structure is a type of a tree structure, in which parent factors have an evaluation value smaller than any of child factors have. The above condition is always met even if operations such as addition and deletion of a factor are performed for the tree. In FIG. 8A, the evaluation values of the individual nodes are rendered in circles representing each of the nodes.

FIG. 8B is an illustration showing the data structure of the individual arrival node data C included in the data of the candidate node heap 181. One piece of the arrival node data C corresponds to one node and represents a variety of information corresponding to the node in the event that a specific route attaining the node is obtained through the route search processing. The arrival node data C include an arrival node ID C1, a previous node ID C2, an attainment cost C3, which is treated as the evaluation value of the heap, a minimum remaining level C4, a maximum remaining level C5, a fixed charging point node ID C6, a preceding charging point node ID C7, and an attainment enable/disable flag C8. Serial numbers are given in the parentheses following the node IDs to the values of the arrival node ID C1, the previous node ID C2, the fixed charging point node ID C6, and the preceding charging point node ID C7.

The arrival node ID C1 is a node ID of an attained node. The previous node ID C2 is a node ID of the node through which the vehicle 200 is to pass just prior to the attained node in the route to the attained node. The attainment cost C3 is the total of the attainment costs taken to attain to the attained node. The minimum remaining level C4 represents the remaining energy level when the vehicle 200 is to attain to the attained node with energy charging as less as possible. The fixed charging point node ID C6 represents the node ID of the charging point at which energy is to be charged just prior to the attained node on a similar occasion. The maximum remaining level C5 represents the remaining energy level when the vehicle 200 is to attain to the attained node with energy charging as frequent as possible. The preceding charging point node ID C7 represents the node ID of the charging point at which energy is to be charged just prior to the attained node on a similar occasion. The attainment enable/disable flag C8 is a flag representing whether or not the vehicle 200 can attain to the attained node with the remaining energy level not falling below the lower threshold set by the upper and lower threshold remaining level setting unit 132.

As seen above, in the arrival node data C there are data not normally used by Dijkstra's algorithm, i.e., the minimum remaining level C4, the maximum remaining level C5, the fixed charging point node ID C6, the last charging point node ID C7, and the attainment enable/disable flag C8.

FIG. 9 is an illustration showing the data structure of a fixed node list. One record constituting the fixed node list DL represents information about one node and includes a serial number D1, a node ID D2, a fixed information D3, and an unfixed information D4. The fixed information D3 includes an attainment cost D31, a previous ID D32, a minimum remaining level D33, and a maximum remaining level D34. The unfixed information D4 includes a minimum cost D41 and a maximum remaining level D42.

The serial number D1 is a serial number assigned to each of the nodes in order from 1. The serial number uniquely corresponds to a node ID through single route search processing. Each of the units including the route search unit 137 can access to each of the records at high speed by using the serial number in place of the node ID. The node ID D2 is a unique identifier assigned to a node represented by the record and corresponds to the start node ID N1 in the node information N (FIG. 6). The fixed information D3 includes the attainment cost C3, the previous node ID C2, the minimum remaining level C4, and the maximum remaining level C5 in the arrival node data C (FIG. 8) upon fixing the route in which the attainment cost to the node represented by the record becomes minimum. The unfixed information D4 is provisional data used when the route in which the attainment cost to the node represented by the record becomes minimum has not been fixed yet. The minimum cost D41 of the unfixed information D4 corresponds to the attainment cost C3 in the arrival node data C (FIG. 8), and similarly, the maximum remaining level D42 corresponds to the maximum remaining level C5 in the arrival node data C (FIG. 8).

Figure 10:
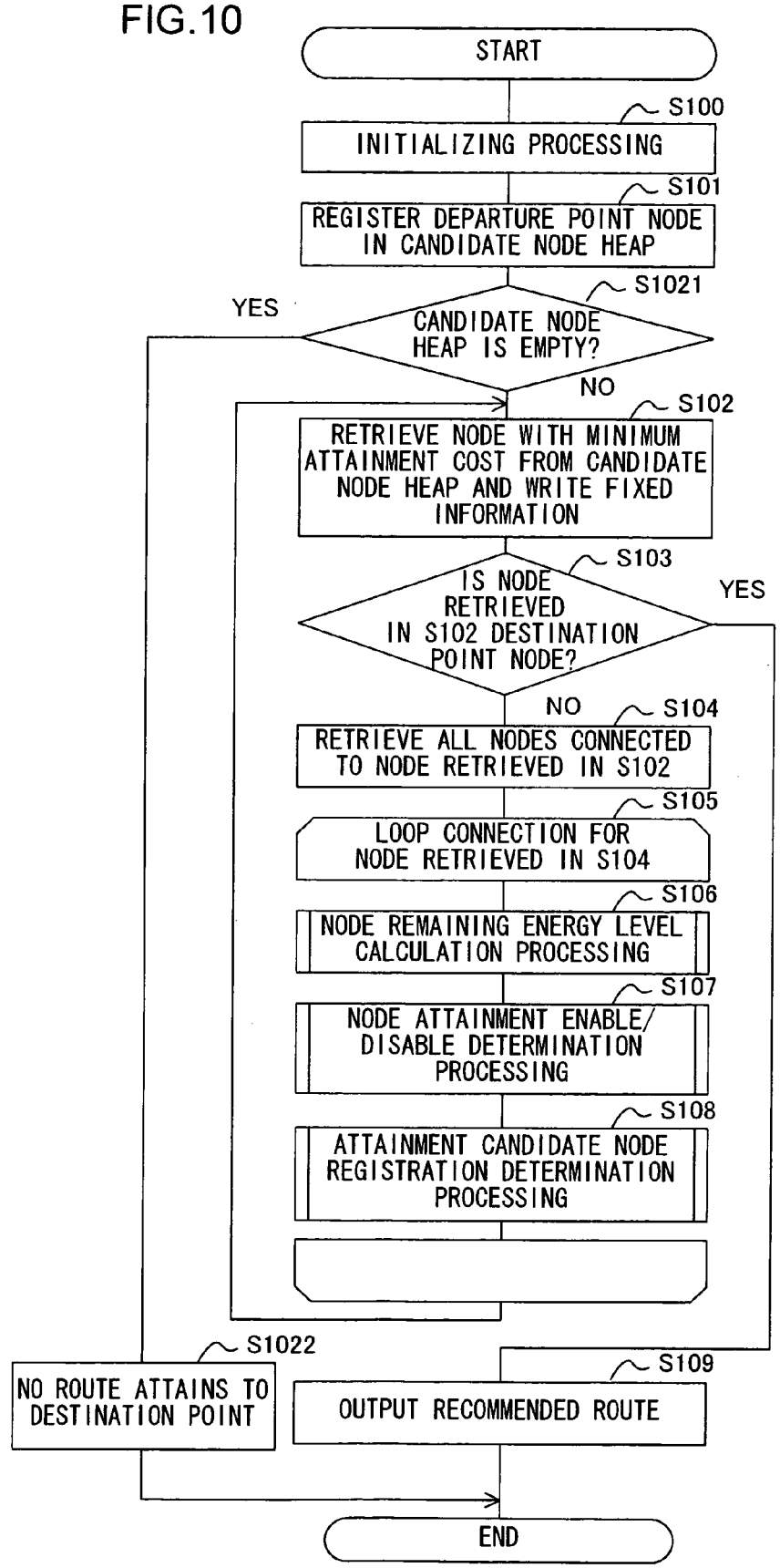
FIG. 10 is a flowchart of route search processing.

(Explanation of Route Search Processing) FIG. 10 is a flowchart of route search processing. The route search processing in the present embodiment is Dijkstra's algorithm used in publicly known route search processing, to which a variety of processing in view of the remaining energy level are added.

In a step S100, the route search unit 137 performs initializing processing. More specifically, the route search unit 137 causes the candidate node heap 181 to be in an empty state and, from the network map DB 122, reads all of the node information within the region at which the route search processing targets. The region is a rectangular region including, for instance, the departure point, the destination point, and its periphery, and one side of the outer circumference of the rectangular region is, for example, approximately 1.5 times to 2 times the distance between the departure point and the destination point. A region that is considered to be unnecessary for the route search is excluded from the rectangular region. Based upon the plurality of node information read out in this manner, the route search unit 137 creates the fixed node list DL shown in FIG. 9 in the DRAM 103. The route search unit 137 causes the node ID included in the node information that has been read out to be stored in the node ID D2 of each of the records of the fixed node list DL, and assigns a serial number beginning with 1 to the serial number D1. The route search unit 137 writes "N/A" representing absence of data in fields of the fixed node list DL except the fields of the serial number D1 and the node ID D2.

In a step S101, the route search unit 137 creates the arrival node data C of the departure point node and registers it to the candidate node heap 181. In other words, the candidate node heap 181 is in a state in which it only includes the arrival node data C of the departure point node. In the arrival node data C of the departure point node, the node ID of the departure point node is set for the arrival node ID C1, 0 is set for the attainment cost C3, the remaining energy level on departure detected by the battery remaining level sensor 107 is set for the minimum remaining level C4 and the maximum remaining level C5, "ENABLE" is set for the attainment enable/disable flag C8, and "N/A" representing absence of data is set for the other items.

In a step S1021, the route search unit 137 makes a decision as to whether or not the candidate node heap 181 is empty. In the step S1021, if the result of the decision made by the route search unit 137 is YES, the route search unit 137 proceeds the flow of the route search processing to a step S1022, then performs processing to return the result of "no route attains to destination point", and terminates the route search processing. The route search unit 137 thus makes a decision as to enable/disable to attain to the destination point. The reason that the empty candidate node heap 181 results in "no route attains to destination point" depends upon the state of the candidate node heap 181 after the processing of a step S108, which will be described in detail later together with the explanation of FIG. 13.

In a step S102, the route search unit 137 retrieves the arrival node data C having a minimum attainment cost C3 from the candidate node heap 181 and stores the information of the arrival node data C in the fixed information D3 of the fixed node list DL. More specifically, the route search unit 137 stores the attainment cost C3 into the attainment cost D31, stores the previous node ID C2 into the previous ID D32, stores the minimum remaining level C4 into the minimum remaining level D33, and stores the maximum remaining level C5 into the maximum remaining level D34. Since the candidate node heap 181 is configured so that a root node has the minimum attainment cost C3, the route search unit 137 may retrieve the root node from the candidate node heap 181.

In a step S103, the route search unit 137 makes a decision as to whether or not the arrival node data C retrieved in the step S102 corresponds to the destination point node. If the retrieved arrival node data C does not corresponds to the destination point node, the route search unit 137 makes a negative decision and the flow of the route search processing proceeds to a step S104.

In the step S104, based upon the node information read out in the step S100, the route search unit 137 retrieves all the nodes connected to the node of the arrival node data C retrieved in the step S102. For each of the nodes thus retrieved, the route search unit 137 creates the corresponding arrival node data C and stores it into the DRAM 103. At this time, the node ID of the retrieved node is set for the arrival node ID C1, the arrival node ID C1 of the arrival node data C retrieved in the step S102 is set for the previous node ID C2, an identical content to that of the arrival node data C retrieved in the step S102 is set for the fixed charging point node ID C6 and the preceding charging point node ID C7, "ENABLE" is set for the attainment enable/disable flag C8, and "N/A" representing absence of data is set for the other items.

In a step S105, the route search unit 137 carries out processing of the step S106 to the step S108 for each piece of the arrival node data C created in the step S104. In a step S106, the node remaining level calculation unit 138 carries out the node remaining energy level calculation processing for each piece of the arrival node data C. In a step S107, the node attainment enable/disable determination unit 139 carries out the node attainment enable/disable determination processing for each piece of the arrival node data C. In the step S108, the candidate node registration determination unit 140 carries out the attainment candidate node registration determination processing for each piece of the arrival node data C. The node remaining energy level calculation processing, the node attainment enable/disable determination processing, and the attainment candidate node registration determination processing will be described later in detail. Upon completion of the processing of the step S106 to the step S108, the route search processing returns to the step S102.

On the other hand, if the route search unit 137 makes a positive decision in the step S103, the flow of the route search processing proceeds to a step S109. In the step S109, the route search unit 137 uses the fixed node list DL so as to output a data string of the arrival node data C from the departure point node to the destination point node, i.e., a data string that represents the recommended route. More specifically, the route search unit 137 first retrieves the node ID D2 of the destination point node and then retrieves the previous ID D32 of the destination point node. After that, the route search unit 137 searches the node ID D2 corresponding to the previous ID D32 from the fixed node list DL and retrieves the previous ID D32 for the searched node ID D2 similarly. The route search unit 137 repeats the processing until the search of the node ID D2 corresponding to the previous ID D32 attains to the departure point node, and reverses the retrieved node ID string in order. Based upon the retrieved node ID string, the route search unit 137 eventually creates and outputs a string of the arrival node data C. The above processing causes the route search unit 137 to output the recommended route.

It is to be noted that in the route search processing explained above, the processing on the lower threshold of the remaining energy level at the time of arrival at the destination point is curtailed. In the case where the lower threshold is to be considered, a decision is made using a lower threshold value set by the upper and lower threshold remaining level setting unit 132 for the destination point node in the node attainment enable/disable determination processing (step S107). It will be described later in detail with the explanation of FIG. 12.

Figure 11:
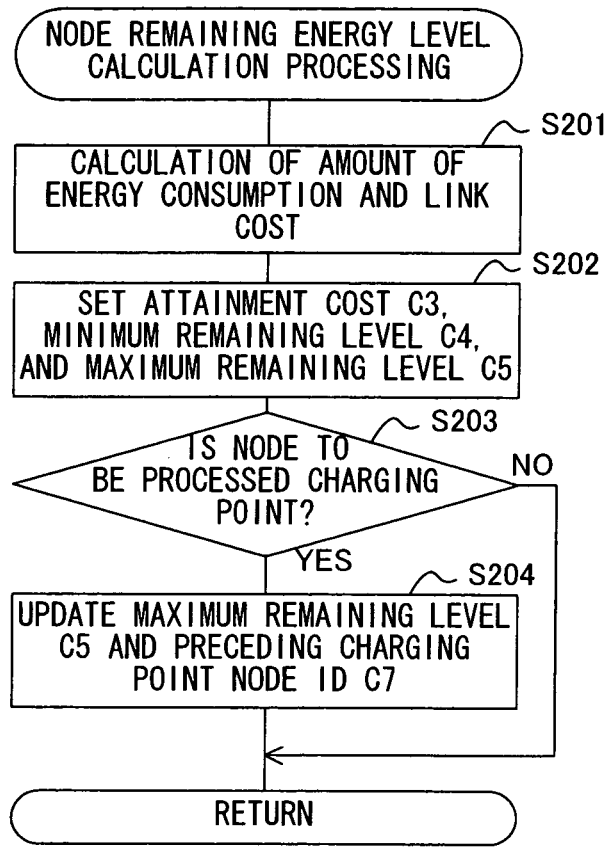
FIG. 11 is a flowchart of node remaining energy level calculation processing.

(Explanation of Node Remaining Energy Level Calculation Processing) FIG. 11 is a flowchart of the node remaining energy level calculation processing. This processing is carried out by the node remaining level calculation unit 138 for a specific piece of the arrival node data C. In the arrival node data C at which this processing targets, "N/A" is set for all of the items except the arrival node ID C1, the previous node ID C2, the fixed charging point node ID C6, the preceding charging point node ID C7, and the attainment enable/disable flag C8.

In a step S201, based upon the node information N of the node to be processed, the node remaining level calculation unit 138 calculates an amount of energy consumption and a link cost. The amount of energy consumption can be calculated by a publicly known method using a predetermined amount of energy consumption per unit distance, the link length L1 (FIG. 6), and the like. A link cost is an attainment cost based upon the search condition set by the search condition setting unit 131. For example, the link cost is calculated by a publicly known method using the link length L1 (FIG. 6) if the search condition is of distance priority, and using the time L3 (FIG. 6) and the traffic informations output by the traffic informations receiver 108 if the search condition is of time priority. Similarly, the node remaining level calculation unit 138 calculates the link cost using the amount of energy consumption described above if the search condition is of low energy consumption, and using a road toll, an energy cost, and the like if the search condition is of low of charge fee.

In a step S202, the node remaining level calculation unit 138 sets the attainment cost C3, the minimum remaining level C4, and the maximum remaining level C5 of the arrival node data C to be processed. The node remaining level calculation unit 138 calculates the attainment cost C3 of the arrival node data C to be processed by adding the attainment cost C3 of the node retrieved in the step S102 and the link cost calculated in the step S201. The node remaining level calculation unit 138 calculates the minimum remaining level C4 and the maximum remaining level C5 of the arrival node data C to be processed by subtracting the amount of energy consumption calculated in the step S201 from the minimum remaining level C4 and the maximum remaining level C5 of the node retrieved similarly in the step S102. It is to be noted that although the amount of energy consumption calculated in the step S201 may take a negative value if the vehicle 200 includes a regeneration brake for example, the amount of energy consumption is treated as 0% for the convenience of processing in this case.

In a step S203, the node remaining level calculation unit 138 makes a decision as to whether or not the node to be processed is the charging point node. In other words, the node remaining level calculation unit 138 makes a decision as to whether or not the value of the charging point flag L4 (FIG. 6) is 1 in the node information N of the node to be processed. If the node to be processed is the charging point node, the node remaining level calculation unit 138 makes a positive decision, and the flow of the node remaining energy level calculation processing proceeds to a step S204. In the step S204, the node remaining level calculation unit 138 updates the maximum remaining level C5 and the preceding charging point node ID C7 of the arrival node data C to be processed and terminates the node remaining energy level calculation processing. More specifically, the maximum remaining level C5 becomes the upper threshold of the remaining energy level set by the upper and lower threshold remaining level setting unit 132, and the preceding charging point node ID C7 becomes the arrival node ID C1 of the arrival node data C to be processed. On the other hand, if the node remaining level calculation unit 138 makes a negative decision in the step S203, it terminates the node remaining energy level calculation processing.

Figure 12:
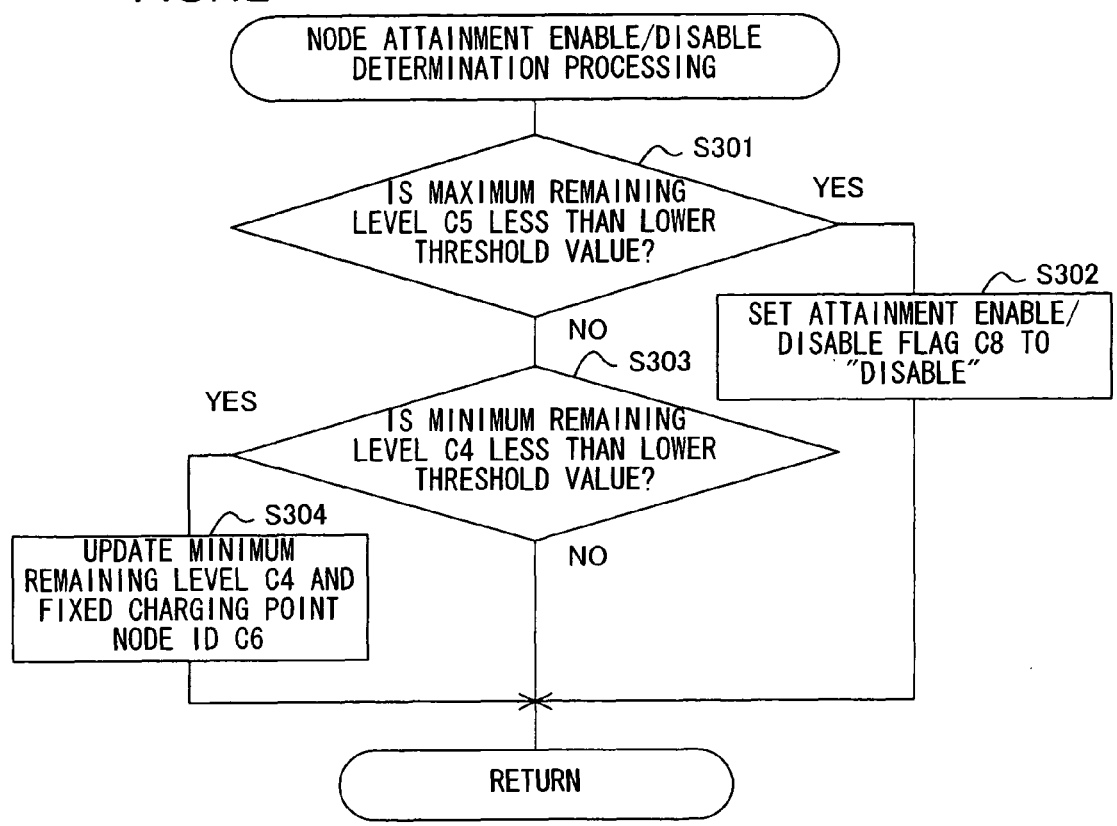
FIG. 12 is a flowchart of node attainment enable/disable determination processing.

(Explanation of Node Attainment Enable/Disable Determination Processing) FIG. 12 is a flowchart of the node attainment enable/disable determination processing. This processing is carried out by the node attainment enable/disable determination unit 139 for a specific piece of the arrival node data C. It is to be noted that the lower threshold of the remaining energy level set by the upper and lower threshold remaining level setting unit 132 is referred to as a "lower threshold value" in the explanation below.

In a step S301, the node attainment enable/disable determination unit 139 makes a decision as to whether or not the maximum remaining level C5 of the arrival node data C to be processed is less than the lower threshold value. If the arrival node is the destination point node, the node attainment enable/disable determination unit 139 makes a decision as to the remaining energy level using the lower threshold value of the destination point set separately by the upper and lower threshold remaining level setting unit 132. Setting of the lower threshold value of the destination point and the present determination processing ensure that the remaining energy level at the time of destination point attainment is equal to or greater than the lower threshold value. As a result, even if the energy can not be charged at the destination point, the vehicle 200 can travel to a charging point that can be attained with at least the remaining energy level of the lower threshold value on the next departure with the destination point as a new departure point. If the node attainment enable/disable determination unit 139 makes a positive decision in the step S301, the flow of the node attainment enable/disable determination processing proceeds to a step S302. In the step S302, the node attainment enable/disable determination unit 139 sets the attainment enable/disable flag C8 of the arrival node data C to be processed to "DISABLE" and terminates the node attainment enable/disable determination processing. On the other hand, if the node attainment enable/disable determination unit 139 makes a negative decision in the step S301, the flow of the node attainment enable/disable determination processing proceeds to a step S303.

In the step S303, the node attainment enable/disable determination unit 139 makes a decision as to whether or not the minimum remaining level C4 of the arrival node data C to be processed is less than the lower threshold value. If the node attainment enable/disable determination unit 139 makes a positive decision in the step S303, the flow of the node attainment enable/disable determination processing proceeds to a step S304. In the step S304, the node attainment enable/disable determination unit 139 updates the minimum remaining level C4 and a fixed charging point C6 of the arrival node data C to be processed and terminates the node attainment enable/disable determination processing. More specifically, the node attainment enable/disable determination unit 139 sets the minimum remaining level C4 to be the same as the maximum remaining level C5 in value and sets the fixed charging point C6 to be the same as the arrival node ID C1 in value. On the other hand, if the node attainment enable/disable determination unit 139 makes a negative decision in the step S303, it terminates the node attainment enable/disable determination processing.

It is to be noted that since the arrival node data C of which the attainment enable/disable flag C8 was set to "DISABLE" in the step S302 indicates a node that can not be attained from the point of view of the remaining energy level, it is not necessary to carry out the loop processing of the step S105 (FIG. 10) any more for the node. Therefore, the route search unit 137 erases the arrival node data C of which the attainment enable/disable flag C8 was set to "DISABLE" from the DRAM 103 and the flow of process returns to the loop processing of the step S105 without carrying out the attainment candidate node registration determination processing of the step S108.

Figure 13:
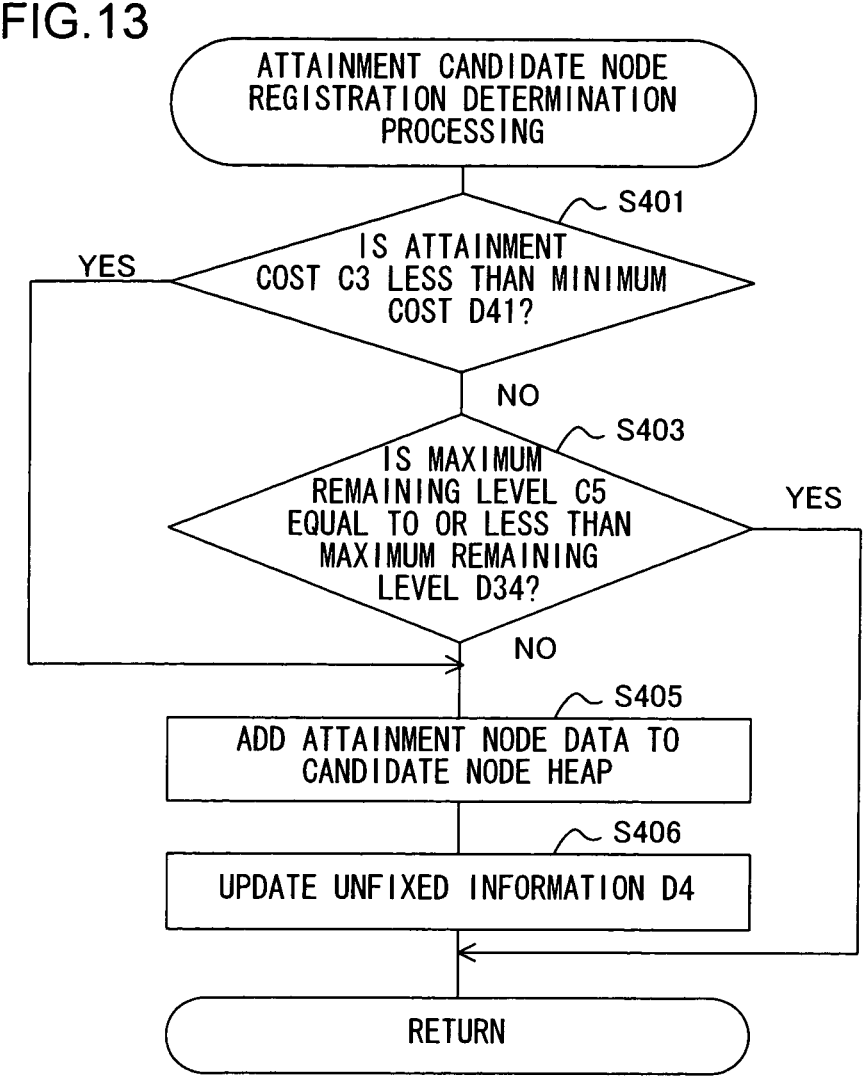
FIG. 13 is a flowchart of attainment candidate node registration determination processing.

(Explanation of Attainment Candidate Node Registration Determination Processing) FIG. 13 is a flowchart of attainment candidate node registration determination processing. This processing is carried out by the candidate node registration determination unit 140 for a specific piece of the arrival node data C.

In a step S401, the candidate node registration determination unit 140 makes a decision as to whether or not the attainment cost C3 of the arrival node data C to be processed is less than the minimum cost D41 of the node stored in the fixed node list DL. This processing is the same as refinement of node by the publicly known Dijkstra's algorithm. In other words, this processing is for reducing the calculation amount by refining only a node with small attainment cost as a candidate. It is to be noted that in the publicly known Dijkstra's algorithm, the processing corresponding to the step S401 is not performed for the node with the fixed minimum route, i.e., the node of which a value other than "N/A" exists in the fixed information D3 of the fixed node list DL. In the present embodiment, however, since even a node with a fixed route may have an insufficient remaining energy level in an upcoming node, the processing of the step S401 is carried out for all the nodes to be processed. If the candidate node registration determination unit 140 makes a positive decision in the step S401, the flow of the attainment candidate node registration determination processing proceeds to a step S405. On the other hand, if the candidate node registration determination unit 140 makes a negative decision in the step S401, the flow of the attainment candidate node registration determination processing proceeds to a step S403.

In the step S403, the candidate node registration determination unit 140 makes a decision as to whether or not the maximum remaining level C5 of the arrival node data C to be processed is equal to or less than the maximum remaining level D34 of the node stored in the fixed node list DL. It is to be noted that if the maximum remaining level D34 is "N/A", the candidate node registration determination unit 140 makes a decision using the maximum remaining level D42 in place of the maximum remaining level D34. If the candidate node registration determination unit 140 makes a positive decision in the step S403, it terminates the attainment candidate node registration determination processing. This is because it is not necessary to carry out the route search processing any more for the node to be processed since the positive decision made in the step S403 means that both of the attainment cost and the remaining energy level are inferior to those of a known route. On the other hand, if the candidate node registration determination unit 140 makes a negative decision in the step S403, the flow of the attainment candidate node registration determination processing proceeds to the step S405.

In the step S405 the candidate node registration determination unit 140 adds the arrival node data C to be processed to the candidate node heap 181. In a step S406, the candidate node registration determination unit 140 updates the unfixed information D4 in the fixed node list DL of the node to be processed. More specifically, the candidate node registration determination unit 140 replaces the minimum cost D41 with the attainment cost C3 of the arrival node data C if the minimum cost D41 is greater than the attainment cost C3 of the arrival node data C. Similarly, the candidate node registration determination unit 140 replaces the maximum remaining level D42 with the maximum remaining level C5 of the arrival node data C if the maximum remaining level D42 is less than the maximum remaining level C5 of the arrival node data C.

The above processing causes the arrival node data C of which the attainment cost C3 is the minimum and the arrival node data C of which the maximum remaining level C5 is the maximum for a specific node to be registered in the candidate node heap 181. In other words, only the node with an advantage either in the attainment cost or in the remaining energy level remains in the candidate node heap 181, and unnecessary route search is not performed. Normally, the greater the attainment cost is, the greater the amount of energy consumption becomes. As a result, the case in which both the attainment cost and the remaining energy level are great is limited to the case of charging energy or the case of traveling a land with an unusual shape. Those types of cases are less likely to occur, and therefore the number of nodes included in the candidate node heap 181 is kept relatively small.

The reason will now be explained which the empty candidate node heap 181 results in "no route attains to destination point", which was mentioned in the explanation of the step S1022 of FIG. 10. As explained above, the arrival node data C of which the attainment cost C3 is the minimum or the maximum remaining level C5 is the maximum is registered in the candidate node heap 181. The arrival node data C of which the attainment cost C3 is the minimum is retrieved sequentially by the processing of the step S102. Then, in a state in which the arrival node data C of which the maximum remaining level C5 is the maximum is not registered in the candidate node heap 181, i.e., a state in which no appropriate charging point exists, the number of nodes in the candidate node heap 181 may become 0 before the route that attains to the destination point is found. Such a state occurs because the node attainment enable/disable determination processing of the step S107 (FIG. 10) gives up providing a new node due to an insufficient remaining energy level or because the attainment candidate node registration determination processing of the step S108 gives up registering a new node due to absence of a node exceeding the maximum remaining level C5. In other words, such a state means that the vehicle 200 can not attain to the destination point at a remaining energy level equal to or greater than the lower threshold value. It is to be noted that although in the case of nonattainment to the destination point the route search processing is to continue to be carried out until the candidate node heap 181 becomes empty, the calculation amount is prevented from explosively increasing because the candidate node heap 181 is to be reduced in size due to the reason described earlier.

(Explanation of Through-Point Automatic Addition Processing) FIG. 14 is an illustration showing the data structure of a recommended route. As shown in FIG. 14, the recommended route output by the route search unit 137 is a data string R in which a plurality of pieces of the arrival node data C (FIG. 8) are strung. The data string R shown in FIG. 14 includes n pieces of the arrival node data C lined up in order from the departure point to the destination point. The through-point automatic addition unit 134 searches change in the fixed charging point node ID in order from the top for the arrival node data C included in the data string R. Upon finding the node whose fixed charging point node ID has changed, the through-point automatic addition unit 134 searches the fixed charging point node ID from the network map DB 122. Then, the through-point automatic addition unit 134 obtains the corresponding charging point ID L5 (FIG. 6) and further searches the charging point ID L5 from the charging point DB 123 (FIG. 7). Based upon the charging point information S obtained in this manner, the through-point automatic addition unit 134 adds data of the through-point including information necessary for display such as the charging point name to the recommended route. Based upon those data, the route display unit 136 performs display of the through-point as shown in FIG. 5. The user can minimize the frequency of energy charging by charging energy at the through-points and by not charging energy at the other charging points on the recommended route. In other words, based upon the change in the fixed charging point node ID, the route search unit 137 calculates the most appropriate timing for energy charging. The most appropriate timing for energy charging means energy charging timing in which the frequency of charging energy is minimum. The route display unit 136 then notifies the user of the most appropriate timing for energy charging by performing the display as above. Notification of the energy charging timing by the route display unit 136 is preformed based upon the energy charging timing calculated by the route route search unit 137.

The following actions and advantageous effects can be achieved by the navigation device according to the first embodiment described above.

(1) As causing the node remaining level calculation unit 138 to update the remaining energy level at each of the nodes, the route search unit 137 searches the recommended route with the minimum attainment cost among routes whose remaining energy level do not fall below the lower threshold value set by the upper and lower threshold remaining level setting unit 132. This achieves the route search in view of the remaining energy level while reducing the calculation amount.

(2) Based upon the minimum remaining level and the fixed charging point node ID, the route search unit 137 calculates energy charging timing with the minimum frequency of energy charging when searching the recommended route. This enables the route display unit 136 to urge the user to charge the energy at the right time.

(3) The upper and lower threshold remaining level setting unit 132 sets the upper threshold value to which the remaining energy level increases due to energy charging at a charging point. Since time required for electric charge of the battery fluctuates significantly depending upon the battery remaining level, this allows the time required for charging energy to be reduced.

(4) The destination point attainment enable/disable determination unit 135 makes a decision as to whether or not the vehicle 200 can attain to the destination point with the remaining energy level not falling below the lower threshold value set by the upper and lower threshold remaining level setting unit 132. This notifies the user that the vehicle 200 can not attain to the destination when there is no charging point in the periphery of the destination point or the like.

Second Embodiment

The car navigation device of the second embodiment performs a selection of an optimal charging point in addition to the route search and the route guidance performed by the navigation device of the first embodiment. It is to be noted that among a variety of circuits and devices included in the navigation device of the second embodiment, the variety of circuits and devices that are common to those included in the navigation device of the first embodiment shown in FIG. 1 and FIG. 2 are designated by the same reference numerals, and their description will be curtailed.

The through-point automatic addition unit 134 of the present embodiment adds a charging point at which energy should be charged as a through-point in a different sequence from that explained with reference to FIG. 14. The through-point automatic addition processing by the through-point automatic addition unit 134 when N charging point nodes to which numerals 1 to N are assigned exist on the recommended route will now be explained.

Electric charge to the battery requires time according to the remaining energy level. A function $T(r_i)$ for estimating the time required for the electric charge is now defined. Here, a variable $r_i$ denotes the remaining energy level when the vehicle 200 travels to the ith charging point. In general, the function $T(r_i)$ is defined so that its value becomes greater as the variable $r_i$ is smaller since the less the remaining energy level is, the longer the time required for electric charge becomes. At this time, the through-point automatic addition unit 134 searches the combination of charging points where "$T(r_0)+T(r_1)+\ldots+T(r_N)$+time required for travel" becomes minimum. This search can be performed by, for instance, linear programming. The through-point automatic addition unit 134 adds the charging point obtained by the search to the recommended route as a through-point.

The following actions and advantageous effects can be achieved by the navigation device according to the second embodiment described above, in addition to the actions and advantageous effects achieved by the navigation device according to the first embodiment.

(1) The through-point automatic addition unit 134 searches a charging point at which energy should be charged in view of electric charging time according to the remaining energy level. This allows the minimum route including the electric charging time to be searched.

The following variations are within the scope of the present invention and any one of or a plurality of the variations may be adopted in combination with the embodiments described above.

Variations (1) The present invention may be adopted not only in the navigation device that operates alone as that of the first embodiment but also in a navigation system including a server that includes a route search function and a client that is connected to the server. For example, the navigation device is configured to include a communication device that performs two-way communication with the server through a mobile phone network, a wireless LAN, or the like, in addition to the battery remaining level sensor 107, the liquid crystal monitor 109, the touch screen 110, and the position detecting device 111 shown in FIG. 1 as well as each of the units of the display map DB 124, the search condition setting unit 131, the upper and lower threshold remaining level setting unit 132, the destination point setting unit 133, and the route display unit 136 shown in FIG. 2. On the other hand, the server is configured to include a communication device that receives a current position, a destination point, the remaining energy level, and a variety of route search conditions from the navigation device, as well as the network map DB 122, the charging point DB 123, and the route search unit 137 shown in FIG. 2. Then, the server transmits the recommended route output by the route search unit 137 to the navigation device through the communication device. The navigation device makes the route display unit 136 cause the liquid crystal monitor 109 to display the recommended route received through the communication device.

(2) While in the embodiment described above a variety of processing in view of the remaining energy level are added to Dijkstra's algorithm, the present invention may be adopted in a route search method other than Dijkstra's algorithm. For instance, the present invention may be adopted in a so-called A-star algorithm, similar to the embodiment described above.

(3) While in the embodiment described above the vehicle 200 is an electric vehicle and the charging point is an energy charge station, the form of the drive energy of the vehicle 200 is not limited to an electrical energy. For example, it may be gasoline when the vehicle 200 is a gasoline vehicle, hydrogen fuel when the vehicle 200 is a hydrogen vehicle, or the like.

(4) While in the first embodiment the charging energy type S4 (FIG. 7) is only "electric charge" among the data stored in the charging point DB 123, the charging point DB 123 may include data of charging points at which a variety of different types of energies are charged. In this case, the route search unit 137 ignores the data of charging points irrelevant to the vehicle 200. For instance, when the vehicle 200 is an electric vehicle, the route search unit 137 ignores a charging point with the charging energy type S4 of "gasoline" and a charging point with the charging energy type S4 of "hydrogen". In addition, the charging point DB 123 may be configured to store two or more types of data into the charging energy type S4 in order to represent that one charging point can supply two or more types of energies.

(5) The upper and lower threshold remaining level setting unit 132 may not perform setting of the lower threshold of the remaining energy level at the destination point. In other words, the lower threshold 144 of the remaining energy level at the destination point may be deleted from the upper and lower threshold remaining level setting screen 141 (FIG. 3). In this case, the lower threshold 142 of the remaining energy level is used also as the lower threshold of the remaining energy level at the destination point. Similarly, it may also be arranged that the upper and lower threshold remaining level setting unit 132 does not perform setting of the upper threshold of the remaining energy level. In this case, the route search unit 137 performs route search processing with the upper threshold of the remaining energy level as 100%.

(6) It may also be arranged that the upper and lower threshold remaining level setting unit 132 automatically sets an energy amount necessary to travel along the route from the destination point to the nearest charging point to the destination point as the lower threshold of the remaining energy level at the destination point.

The present invention is not limited to the embodiments described above as long as the features characterizing the present invention remain intact, and other embodiments which may be conceived of within the technical idea of the present invention are also included within the scope of the present invention.

What is claimed is:

1. A navigation device, comprising:
a position detecting unit that detects a current position of a vehicle;
a remaining energy level detecting unit that detects a remaining level of drive energy of the vehicle;
a storage unit that stores map information including position information of a charging point of the drive energy for the vehicle;
an energy consumption amount calculation unit that calculates a consumption amount of the drive energy when the vehicle travels along any link included in the map information based upon the map information;
a route calculation unit that calculates a route from the current position to a destination point; and
a route guidance unit that performs route guidance for the vehicle based upon a result of calculation by the route calculation unit, wherein:
the route calculation unit calculates a recommended route with a minimum attainment cost among routes in which the remaining level does not fall below a predetermined threshold level by, when searching routes including nodes next to an end point node of a fixed route, with regard to each node next to the end point node, calculating other routes on which the vehicle can travel to the each node via the fixed route without the remaining level less than the predetermined threshold and fixing a route with the remaining level being maximum among the other routes as a route to the node via the fixed route in case of the remaining level after traveling on a route to the node with a minimum cost among the other routes based upon the position information of the charging point and the consumption amount calculated by the energy consumption amount calculation unit, from the end point node to the each node, wherein the navigation device further comprising:

an upper and lower threshold level setting unit that sets the predetermined threshold level and an upper threshold level of the remaining level, wherein:

the route calculation unit calculates the recommended route in a condition that charging of the drive energy at the charging point increases the remaining level to the upper threshold level.

2. A navigation device according to claim 1, further comprising:

a notification unit that notifies a driver of energy charging timing of the drive energy during the route guidance by the route guidance unit, wherein:

the route calculation unit calculates the energy charging timing in which a frequency of charging the drive energy is minimum at the charging point through which the vehicle passes when traveling along the recommended route; and the notification unit performs notification of the energy charging timing based upon the energy charging timing calculated by the route calculation unit.

3. A navigation device according to claim 2, wherein:

the route calculation unit calculates and stores the minimum attainment cost as well as a minimum value and a maximum value of the remaining level in calculation of the recommended route.

4. A navigation device according to claim 1, further comprising:

an attainment enable/disable determination unit that makes a decision as to whether or not the vehicle can attain to the destination point with the remaining level not falling below the predetermined threshold level.

5. A navigation device according to claim 1, further comprising:

a lower threshold value setting unit that sets a lower threshold value of the remaining level at the destination point, wherein:

the route calculation unit calculates the recommended route in which the remaining level at the destination point is equal to or greater than the lower threshold value.

6. A navigation device according to claim 1, wherein:

the route calculation unit calculates the recommend route via the charging point in reference to the position information of the charging point.

7. A navigation device according to claim 1, wherein:

a frequency of charging the drive energy at the energy charging point is minimum in the recommended route among a plurality of routes from the current position to the destination point calculated by the route calculation unit.

8. A method for a route calculation, comprising:

a remaining energy level setting step of setting a remaining level of drive energy of a vehicle on departure;

an energy consumption amount calculation step of calculating a consumption amount of the drive energy, based upon map information including position information of a charging point of the drive energy for the vehicle, when the vehicle travels along any link included in the map information; and a route calculation step performed by a microprocessor of calculating a route from the current position to a destination point, wherein:

in the route calculation step, a recommended route including a minimum attainment cost is calculated among routes with the remaining level not falling below a predetermined threshold level by, when searching routes including nodes next to an end point node of a fixed route, with regard to each node next to the end point node, calculating other routes on which the vehicle can travel to the each node via the fixed route without the remaining level less than the predetermined threshold and fixing a route with the remaining level being maximum among the other routes as a route to the node via the fixed route in case of the remaining level after traveling on a route to the node with a minimum cost among the other routes based upon the position information of the charging point, and the consumption amount calculated in the energy consumption amount calculation step from the end point node to the each node, wherein the method further comprising:

an upper and lower threshold level setting step of setting the predetermined threshold level and an upper threshold level of the remaining level, wherein:

the route calculation step of calculating the recommended route in a condition that charging of the drive energy at the charging point increases the remaining level to the upper threshold level.

\* \* \* \* \*